United States Patent
Wang (10) Patent No.: US 7,525,286 B2
(45) Date of Patent: Apr. 28, 2009

(54) METHOD AND DEVICE FOR VEHICLE BATTERY PROTECTION WITH BATTERY POWER SOURCE NOISE PATTERN ANALYSIS

(75) Inventor: Jeen-Shuh Wang, Taipei (TW)

(73) Assignee: Jason Auto Technology Co., Ltd., Las Vegas, NV (US)

( * ) Notice: Subject to any disclaimer, the term of this patent is extended or adjusted under 35 U.S.C. 154(b) by 414 days.

(21) Appl. No.: 11/318,621

(22) Filed: Dec. 28, 2005

(65) Prior Publication Data
US 2007/0145950 A1 Jun. 28, 2007

(30) Foreign Application Priority Data
Dec. 31, 2004 (CN) .................. 2009 3 0141930

(51) Int. Cl.
*H02J 7/00* (2006.01)
(52) U.S. Cl. .............. 320/133; 320/104; 320/105
(58) Field of Classification Search ......... 320/104, 320/105, 133
See application file for complete search history.

(56) References Cited

U.S. PATENT DOCUMENTS

| | | | | |
|---|---|---|---|---|
| 3,623,131 A | * | 11/1971 | Russell ............ | 307/10.7 |
| 4,493,001 A | * | 1/1985 | Sheldrake ......... | 361/92 |
| 5,327,068 A | * | 7/1994 | Lendrum et al. ...... | 320/136 |
| 5,994,881 A | * | 11/1999 | Miyazaki et al. ..... | 322/16 |
| 6,091,228 A | * | 7/2000 | Chady et al. ....... | 320/132 |
| 6,111,731 A | * | 8/2000 | Cepynsky et al. .... | 361/23 |
| 6,191,558 B1 | * | 2/2001 | Arai et al. ......... | 320/132 |
| 6,437,575 B1 | * | 8/2002 | Lin et al. .......... | 324/433 |
| 7,106,026 B2 | * | 9/2006 | Moore ............ | 320/104 |

* cited by examiner

*Primary Examiner*—Akm E Ullah
*Assistant Examiner*—Samuel Berhanu
(74) *Attorney, Agent, or Firm*—Muncy, Geissler, Olds & Lowe, PLLC (57) ABSTRACT

An electric source noise pattern analysis method for vehicle battery protection and power management and device thereof provides ignition status recognized against battery discharge due to electric equipment requirement. This device is connected in parallel with the main battery and backup battery of a vehicle. This device features the addition of a source characteristic sensing unit which analyzes voltages, currents, power noises of main battery and backup battery, a pattern analysis method which utilizes the sensing characteristics to recognize the running and power used situation of vehicle, and a power management and control unit which employs at least one adjustment timer to manage main battery and backup battery relied on the vehicle situation. The device which operates to connect and disconnect the main and the backup battery from the load based on a sophisticated management algorithm to control to prevent from power exhausted by electric appliances.

17 Claims, 12 Drawing Sheets

METHOD AND DEVICE FOR VEHICLE BATTERY PROTECTION WITH BATTERY POWER SOURCE NOISE PATTERN ANALYSIS

BACKGROUND OF THE INVENTION

The present invention relates to a method and device for vehicle battery protection, especially to a method and device for vehicle battery protection with battery power source noise pattern analysis that manages power consumption and battery power, being applied through circuit design. The present invention is applied for safety management of vehicle batteries with an engine starter and a charging device.

Power supply for vehicles makes much of accuracy and safety. One of the most important purposes of power supply system is to supply vehicles and users stable, adequate and convenient electricity. The power consumption of vehicles is getting complicated because after the vehicle stops running, the batteries still supply power to electric appliances such as notebooks, book lights, audio devices, air conditioners, microwaves, and refrigerators, etc. Or the user may forget turn off head lamps so that the power exhaust after a period of time. The electric starting device of the vehicle such as starts requires certain voltage and current for starting the vehicle engine, thus further driving the generator. When the power exhausted or the voltage and current are lower than the requirements, the starting device of engine can't operate normally so that the vehicle engine can't be started. This leads to safety problem and inconvenience on usage.

In order to make vehicle have enough battery voltage and current to restart the starting device for driving the engine after stopping and turning off the engine, there are a lot of prior arts related to the battery power management. Refer to U.S. Pat. No. 6,437,575, the prior art measures and displays residual electricity of batteries. Or in Journal of Power Source, 2002, a study made by Mr. Johnson is to measure internal resistance of batteries. These prior arts provide prediction or warning effect.

After the engine stopping, power supply for battery charger also stops. The vehicle batteries are not charged. Along with the consumption of electricity, the batteries continue discharging, even exhaust, both the man battery as well as the backup battery. Refer to U.S. Pat. Nos. 4,493,001, 6,111,731 and 5,327,068, power supply from battery is cut off immediately or a period of time after the engines stopping running. However, there are more and more electric appliances being applied on vehicles and used after the engine stop such as notebooks, book lights, audio devices, air conditioners, microwaves, and refrigerators, etc. Other devices for general use included the security system or alarm lights on vehicle. Abnormal conditions for battery discharge such as forgetting to turn off head lamps, electric leakage to environment may also cause battery exhaustion. Therefore, it is important to ensure the battery with enough electricity for starting next time no matter for general use or under abnormal conditions.

Since after the engine stopping running, other peripherals electric appliances may be still in use. In order to prevent power exhaustion, the power should be managed. For sake of the safety, power supply from the main battery or the backup battery is cutoff depending on conditions. When the starting device restarts the engine, the disconnection may happen and cause break of the electric appliances or rebooting of the notebook. When the engine runs and the generator is driven to charge batteries, the electric appliances can be in use at the same time. Refer to U.S. Pat. No. 5,903,063, it applies the filtered and amplified ignition noise signal to a hysterics latch circuit. Without getting data from vehicle control computer, a battery protection device for an independent system is connected with a battery power source cable in parallel for detecting starting of vehicles. However, power consumption by both electric appliances and vehicle ignition discharges the batteries. Both generate voltage reduction or noise of battery power supply. From the noise or voltage reduction, only power consumption is learned. In order to check vehicle status such as stop or start, management status, safety and protection for battery power under conditions that various combinations of electric appliances are used when the engine is off or restarted, it is necessary to identify discharging pattern by the parallel power source cable. Then through the checking results, battery power source management for vehicles under normal or abnormal conditions is generated for safety of vehicles and drivers.

SUMMARY OF THE INVENTION

It is therefore a primary object of the present invention to provide a method and device for vehicle battery protection with battery power source noise pattern analysis that analyzes noises from battery power being used by vehicle electric appliances and vehicle starting device. It is also applied to manage battery power after the engine being shut off so as to control battery power efficiently under normal use as well as inadequate use situation, and prevent from power exhaustion that raises safety issue and restarting problems.

In order to achieve object, the present invention provides a device that connects with a battery power source cable in parallel, without obtain vehicle status from vehicle control system, analyzes noise of vehicle starting device and electric appliances in frequency pattern for recognition of power consumption, and manages as well as protects battery power after the vehicle engine being turned off. By use of the battery power source cable connecting with the power source of the main battery and the backup battery, the present invention detects voltages, currents, and noises introduced by operation of the vehicle engine and peripherals and runs pattern analysis and identification by the features of the detected voltages, currents, and noises for protecting and managing the batteries. When the vehicle engine is turned on, the device judges whether the vehicle engine and generator are turned on normally while there is not power consumed by other electric appliances, then start charging the battery sets. After the vehicle' engine stopping running and the generator being turned off, the battery power management is started to judge whether the vehicle stops normally, the power consumption is normal or abnormal. Under normal and inadequate power consumption of the battery, the device manages power cutoff or supplying by the main batter as well as the backup battery, displays status or shows warnings of the batteries states, and protect and ensure safety of the main battery as well as the backup battery.

Different power frequency pattern composed by the currents, voltages and noises are used to check vehicle status and manage battery power after being analyzed. When the vehicle stops running, the present invention prevents the power exhaustion that causes difficulties of restarting, protects vehicle batteries, and improves electrical safety of vehicles. According to requirement for power management, the main power source is switched between the main battery and the backup battery for convenience of users.

DETAILED DESCRIPTION OF THE PREFERRED EMBODIMENT

Figure 1:
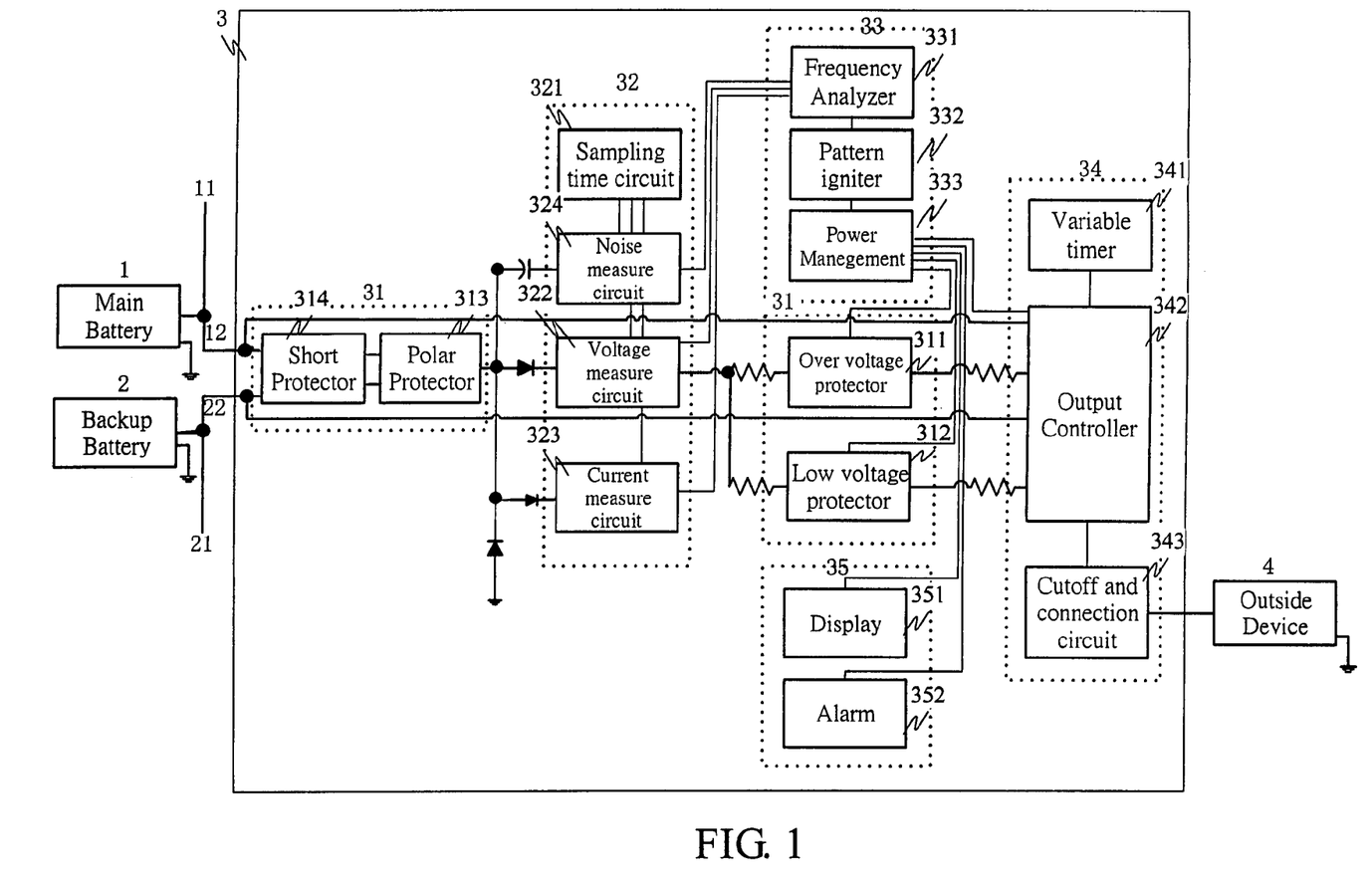
FIG. 1 is a schematic drawing of a battery protection device in accordance with the present invention.

Refer to FIG. 1:

Referring to the FIG. 1, wherein like reference numbers refer to like parts:

vehicle main battery 1: a set of 12VDC (direct current) lead-acid battery, nominal voltage Vp=12VDC, nominal current Ap=4 A;

vehicle backup battery 2 : a set of 12VDC (direct current) lead-acid battery, nominal voltage Vp=12VDC, nominal current Ap=4 A vehicle generator: with electric starter provided charging current;

connection of batteries: the connecting of the vehicle battery protect device 3 with the vehicle power system is the vehicle battery protect device 3 connects in parallel with the positive poles of the main battery 1 and the backup battery 2, while the vehicle battery protect device connects in series with outside device 4;

(1) A Method for Battery Power Source Noise Pattern Analysis and Management the Battery of an Embodiment in Accordance with the Present Invention:

the method analyzes power signals from power source only, without input the vehicles control signals. Under the limited information input, the method judges whether a vehicle engine operating normally or already stop by using the power source, so as to employ correctly strategy for battery protection and power management. While power consumption by vehicle or outside device 4, the voltage and current of main battery set 1 and the backup battery set 2 will rapid change or reduction, thus the change of the voltage and current can't confirm that vehicles turn on normally, or the engine is off. The main cause of the fact that the change or reduction may introduced by various outside device 4 and vehicle electric devices, such as notebooks, cellular phones, book lights, audio devices, air conditioners, microwaves, refrigerators, car alarm and flash light, etc. When these electronics are in use, the voltage as well as the current varies dramatically. Thus it is easy to get confused to manage power and protect batteries through variations of the voltage and the current. As to the outside device of vehicles and generators driven by engines, they make change in both voltage and noise. When using outside device, besides the voltage reduction, noise with different frequencies may happen. For example, vehicles lamps, and a car cigarette lighter that uses output electricity directly will generate low-frequency oscillation noise, while DC-DC converter serves electrics such as notebooks, cellular phones, air conditioners, and refrigerators may generate high-frequency oscillation noise. A plurality of sets of successive noises are generated when only the generator operates. When vehicles turn on the generator, voltage noise is generated and the battery voltage is descend and rise again, that's the noise from power source for checking whether vehicle generators are running.

The method for battery power source noise pattern analysis of the present invention takes samples of voltage as well as current from the main battery, the backup battery and vehicle, during periodically sampling time. According to specific sampling interval, compare sample noise pattern with the noise pattern of reference voltage and reference current of the main battery. The reference voltage and reference current of the backup battery, and reference background noise are said as reference noise pattern. In a plurality of sampling time, the voltage and current of the main battery, the voltage and current of the backup battery, noise introduced from running vehicle, is to compare with the reference noise. When the vehicle starts, the engine works, noises generated from the main battery voltage, current, the backup battery voltage, current and voltage noise by the running of the vehicle engine. The noise pattern is compared and analysis of different frequencies and waveform, it can identify that whether the vehicle engine running normally or turned off. The suitable of sampling time interval is relative and whether the necessary noise information is obtained, and directly correlated with each other. In order to reduce complexity of circuitry, the present invention provide the pattern analysis by sampling noises introduced by the main battery voltage, the backup battery voltage and current, and the vehicle generator noise only. The information used to identify whether the vehicles engine starts and the generator start to charger the battery and supply power to electrical equipments, or the vehicle turns off the generator stops to charge the battery and stop to supply power. According to the situation of predetermined set-time or voltage drops, then cuts off power supply from the main battery and the backup battery. The purpose of vehicle battery protect device can reserve power for restart vehicle engine. This is a feature of the present invention.

The method for checking that the vehicle engine starts supplying power and charging the batteries is comparing the frequency pattern of the noise introduced by the generator being turned on by the vehicle engine. The first necessary condition of the frequency pattern is checking the noise introduced from the vehicle engine operates. In an embodiment of the present invention, under the proper sampling period, the preferred samples are successful been identified matching the frequency characteristics, then result that the engine been restart. The proper sampling period said, 5 to 10 continuous sampling noise. If there is one sample noise not satisfied with above condition, re-sample the noise. The second necessary condition of the frequency pattern is checking the voltage of the vehicle main battery. In an embodiment of the present invention, the preferred sampling is that the vehicle battery voltage is higher than the second voltage $V_H$ on successive 3 to 8 continuous sampling time. If there is one sample not satisfied with above condition, re-sample the noise. When both the first and the second necessary condition are satisfied, it is identified that the vehicle engine starts the generator to provide power and takes the reset for charging the main battery and the backup battery.

The method for checking that the vehicle engine stops supplying power and stop to charge the batteries is comparing the frequency pattern of the noise introduced by the generator being turned off by the vehicle engine. The first necessary condition of the frequency pattern is that: if the vehicle shutdown, the generator stop to charge the main battery and backup battery. At this moment, continuously detect voltage and current of vehicle batteries as well as voltage noise from the vehicle generator. When the vehicle stops and the engine is off, there is no more voltage noise of the vehicle generator introduced. The proper sampling time depends on the noise introduced. In an embodiment of the present invention, the preferred sampling is that on successive 5 to 10 continuous sampling time. For all sampling time, the sample noises are not matching the frequency characteristics, then the vehicle engine stop. If there is one sample not satisfied with above condition, re-sample the noise. The second necessary condition of the frequency pattern is checking the voltage of the vehicle main battery. In an embodiment of the present invention, the preferred sampling is that the vehicle battery voltage is lower than the second voltage $V_H$ on successive 3 to 8 continuous sampling time. If there is one sample not satisfied with above condition, re-sample the noise. When both the first and the second necessary condition are satisfied, it is identified that the vehicle engine stops, the generator does not provide power. The power supply turns from the main battery.

A method is for management the main battery. There are two conditions of checking whether the main battery should be cutoff the supplying power to outside device and reserve enough battery energy for vehicle restart. The first condition accords to the preset time for supplying power. When the time is up, this condition is satisfied. The second condition is that the voltage of the main battery is lower than the first voltage $V_L$. Once one of the two conditions is satisfied, the power from the main battery is cut off and the circuit is connected to the backup battery for power supply continuously. The preset time for power supply is set and adjusted in accordance with the battery capacity, power consumption of vehicle outside device, and the electricity need for starting vehicles.

A method is for management the backup battery. Checking whether the backup battery should be cut off supplying power to outside device is in condition that the voltage of the backup battery is lower than the first voltage $V_L$, then cut off the power supply from the backup battery.

(2) A Power Supplier Protector 31 of an Embodiment in Accordance with the Present Invention As shown in FIG. 1, in a power supplier protector 31 of an embodiment in accordance with the present invention, an over voltage protector 311 prevents components of circuitry from damaging caused by over voltage of the battery and outputs signals to an output controller 342 for generating signals of cutting off or connecting with power so as to cut off or connect with power from the battery. A low voltage protector 312 prevents battery ageing or abnormal caused by low voltage and outputs signals to an output controller 342 for generating signals of cutting off or connecting with power so as to cut off or connect with power from the battery. A polar protector 313 is used to protect components when the polarity of the battery is connected in reverse direction. A short protector 314 prevents the battery protection device being fried when there is a short happened.

(3) A Source Characteristic Sensing Unit 32 of an Embodiment in Accordance with the Present Invention A source characteristic sensing unit 32 includes a sampling time circuit 321 that sets different sampling time for different receive and measure circuit, a voltage receive and measure circuit 322 for the main battery 1, a current receive and measure circuit 323 for the backup battery 2, and a noise receive and measure circuit 324 for a power source of vehicle generator. The voltage receive and measure circuit 322 of the main battery 1 detects voltage of the vehicle main battery 1 once at a specific sampling time and the result is input into an input end of a frequency analyzer 331 of an source characteristic receive and measure unit 33. The current receive and measure circuit 323 of the backup battery 2 detects current of the vehicle backup battery 2 once at a specific sampling time and the result is input into an input end of a frequency analyzer 331 of an source characteristic receive and measure unit 33. The noise receive and measure circuit 324 detects noise generated from the vehicle generator once at a specific sampling time, then the result is amplified, and is input into an input end of a frequency analyzer 331 of an source characteristic receive and measure unit 33.

Figure 2A:
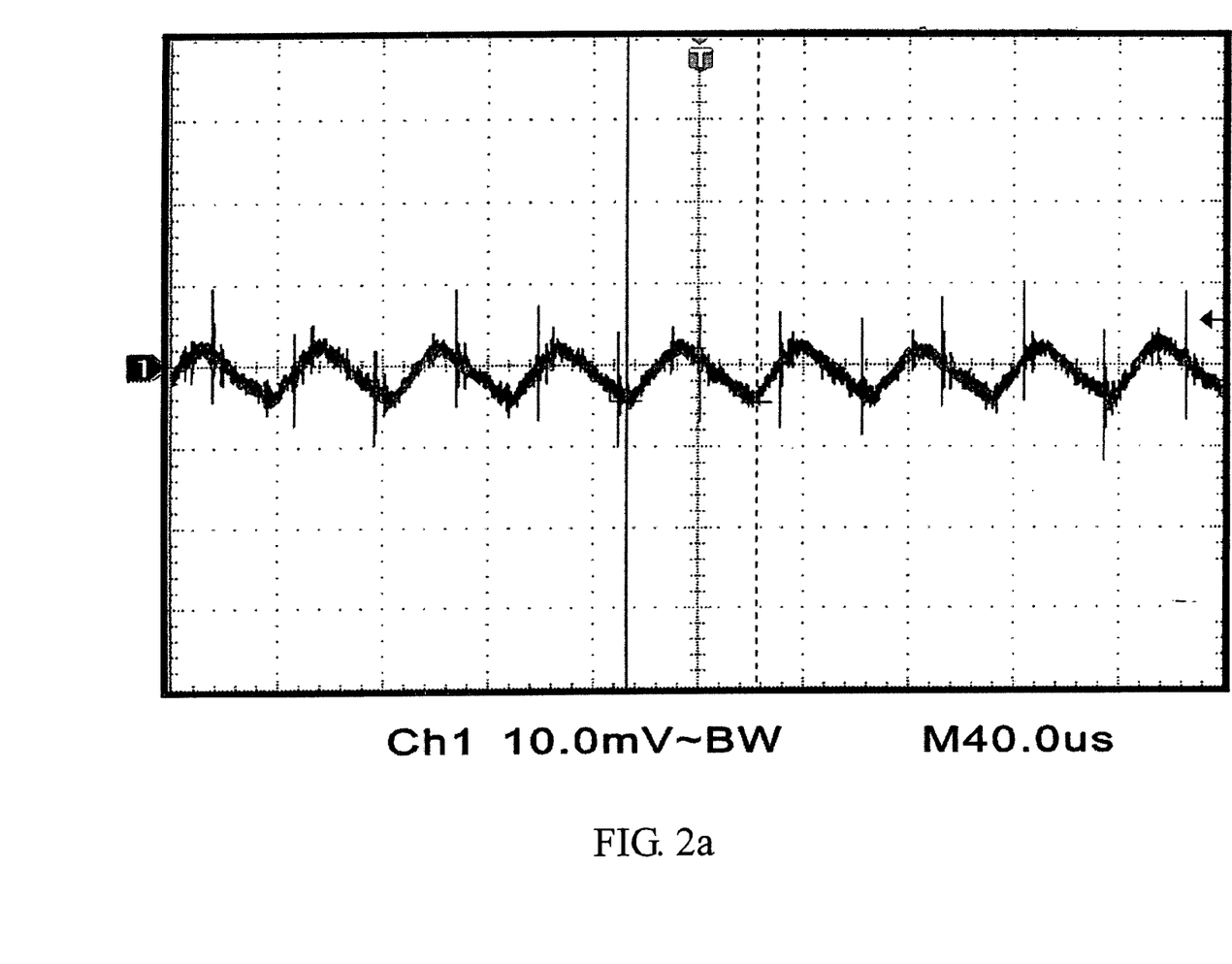
FIG. 2A is an embodiment of high frequency noise generated by electric appliances on vehicles.
Figure 2B:
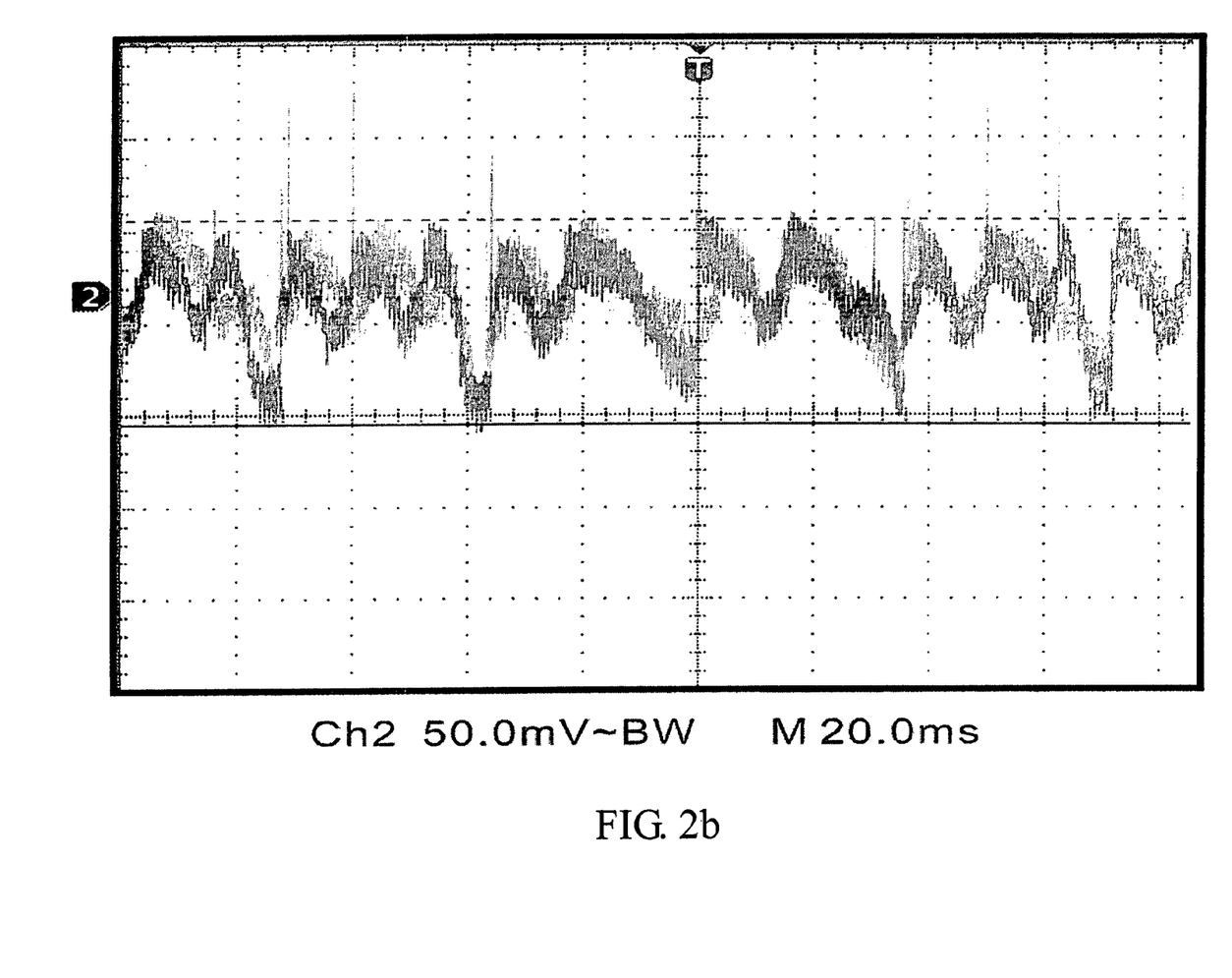
FIG. 2B is an embodiment of nominal frequency noise generated by electric appliances on vehicles.
Figure 2C:
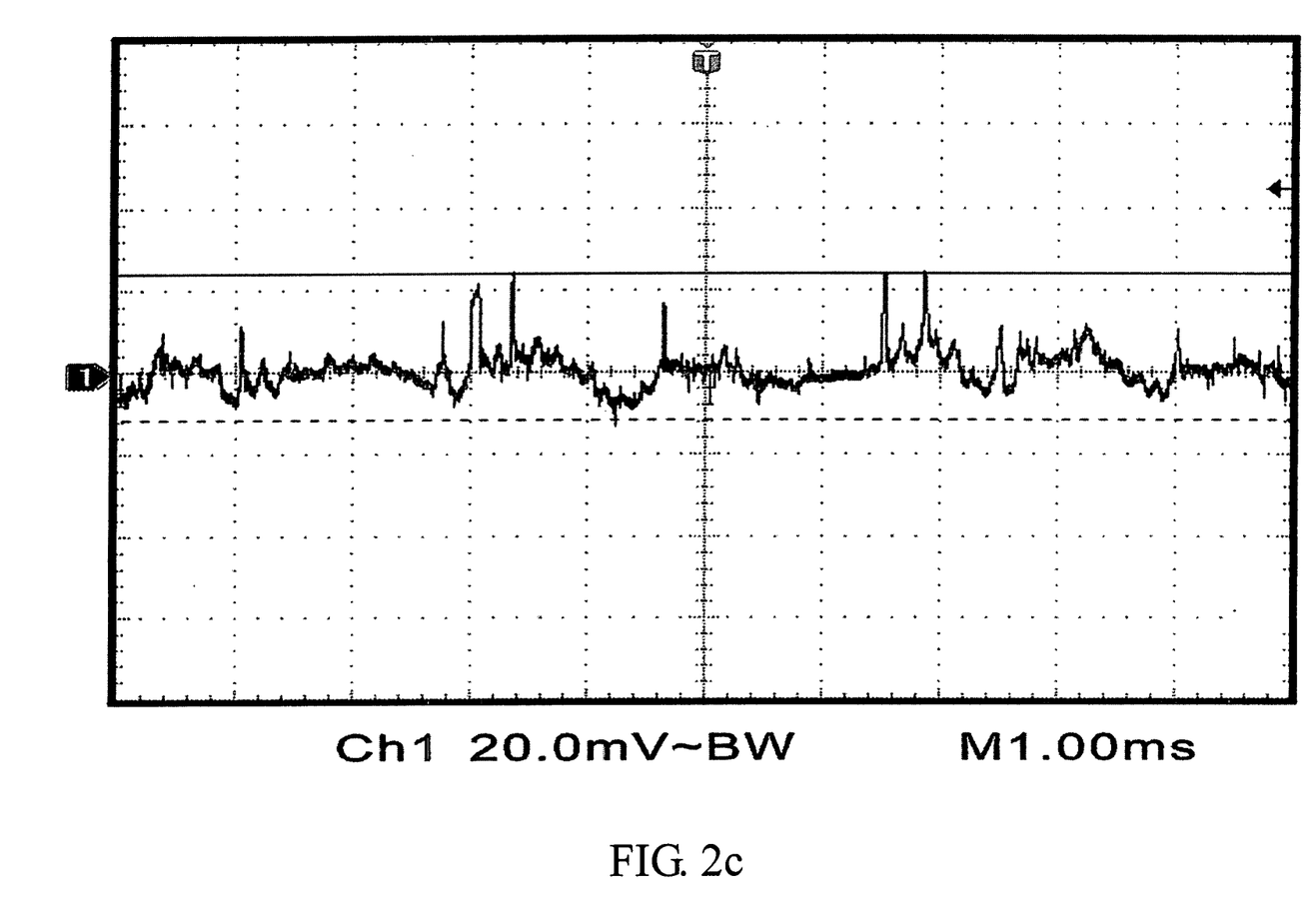
FIG. 2C is another embodiment of nominal frequency noise generated by electric appliances on vehicles.
Figure 2D:
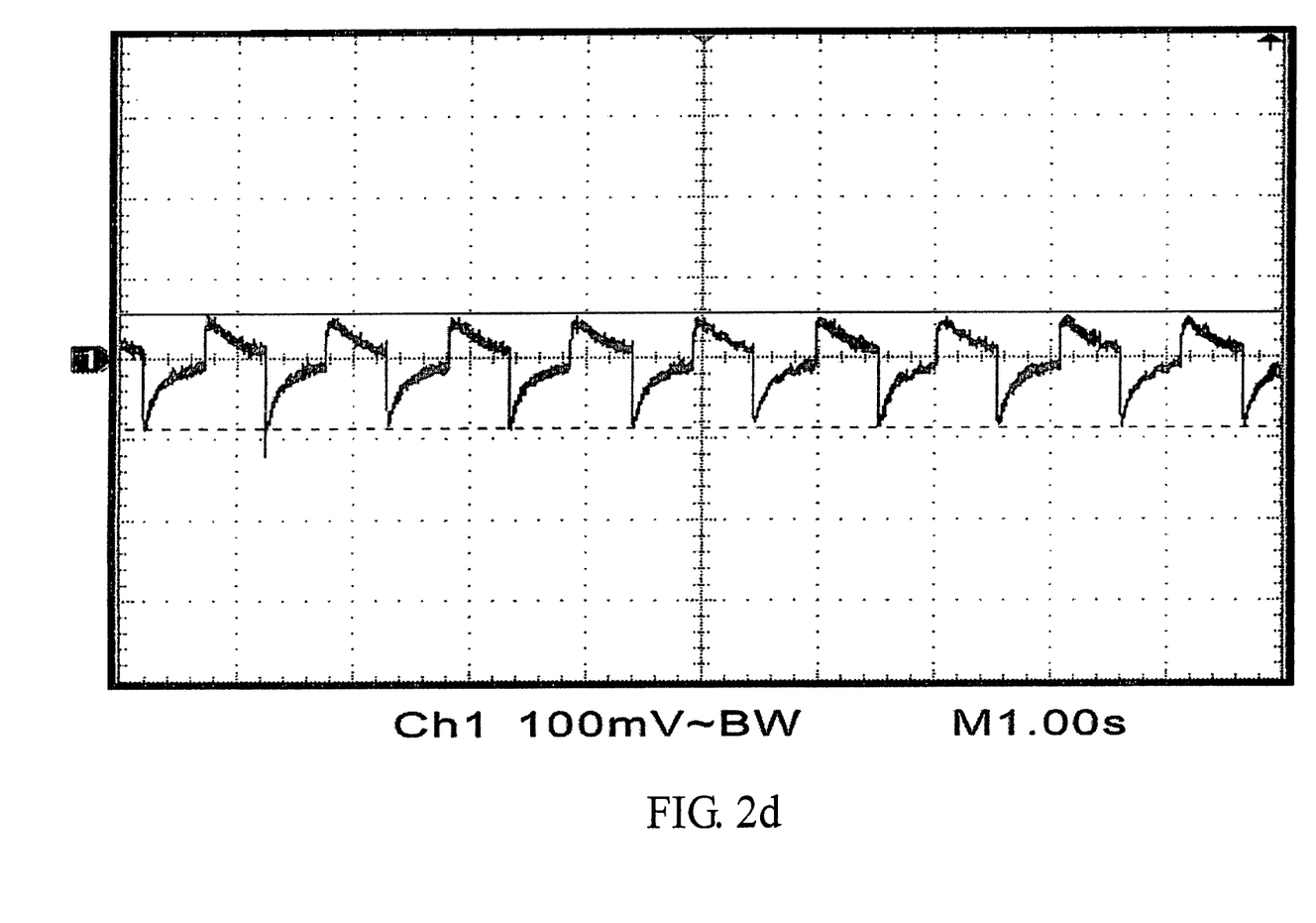
FIG. 2D is an embodiment of low frequency noise generated by electric appliances on vehicles.
Figure 2E:
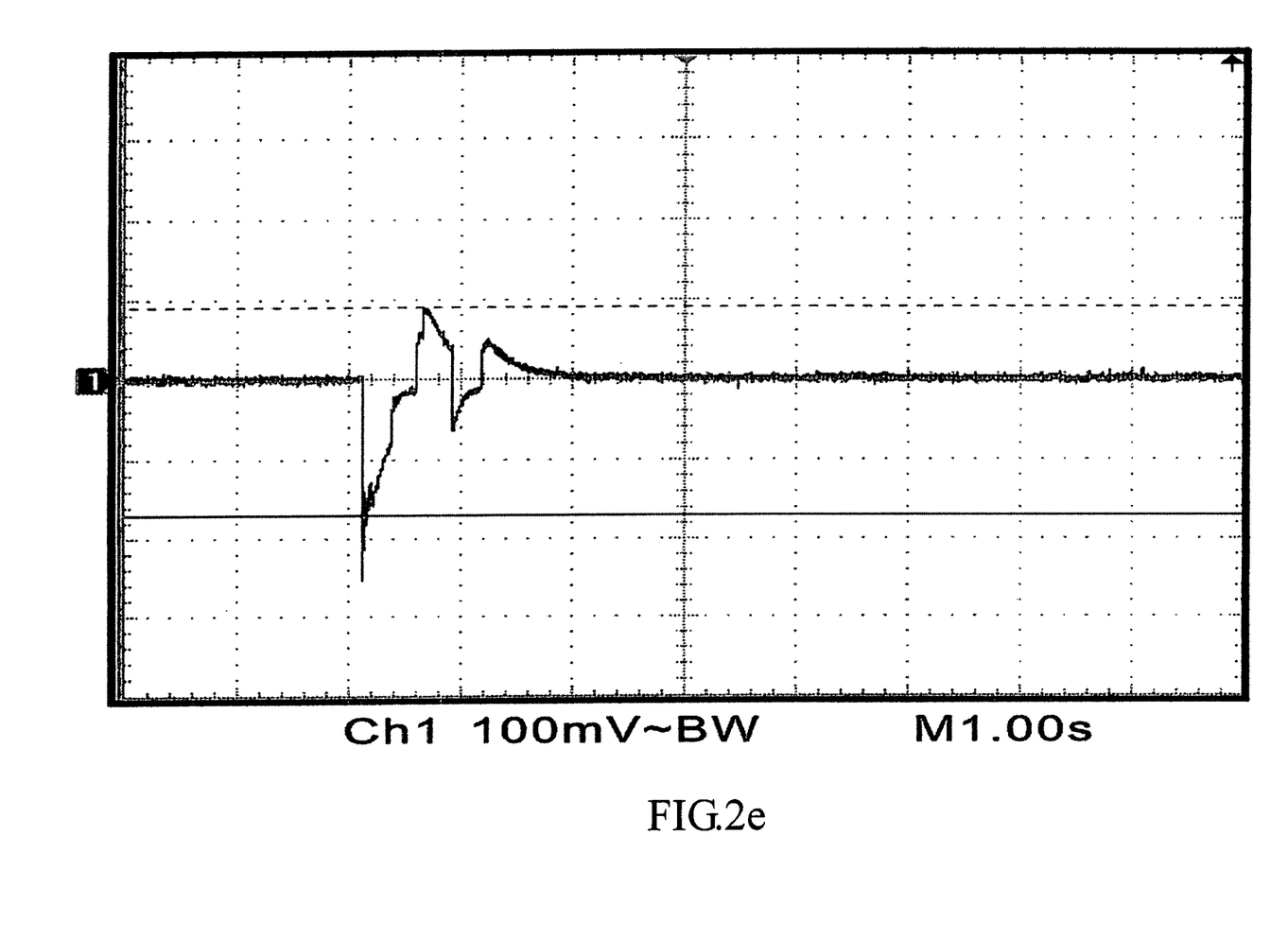
FIG. 2E is an embodiment of one-time noise generated by electric appliances on vehicles.

In order to minimize the parts or simplify the detector and circuit, the present invention has no vehicle noise sensor, temperature sensor and without getting information from vehicle control computer. Instead of above parts, a noise receive and measure circuit 324 on an end of battery power is developed to get power source noise generated by operation of the vehicle engine. According to frequency and magnitude of the noise, said noise pattern, the power source noise pattern is classified into four types. The first type is high-frequency noise, with frequency ranging from 1 μs to 1 ms such as noise generated by DC-DC notebooks or cellular phones, as shown in FIG. 2A. The second type is middle-frequency noise, with frequency ranging from 1 ms to 100 ms such as 20 ms noise generated by the vehicle generator while starting, as shown in FIG. 2B, or 0.1 ms noise generated by air conditioner, as shown in FIG. 2C. The third type is low-frequency noise, with frequency ranging from 500 ms to several seconds such as noise generated by blinking vehicle lamps, as shown in FIG. 2D. The fourth type is one-time noise, such as noise generated by a remote controller or turning on lights inside the vehicle, as shown in FIG. 2E.

Figure 3:
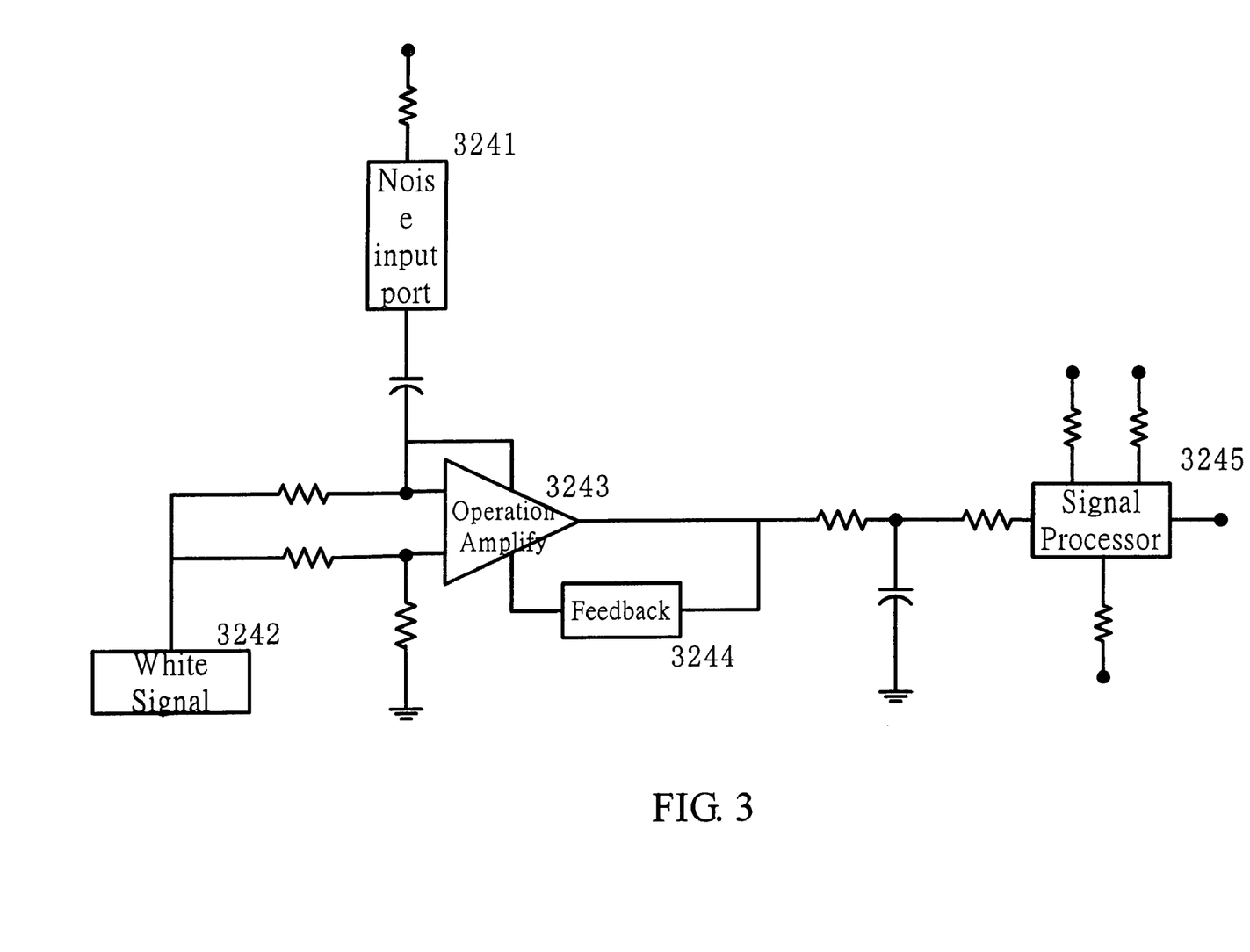
FIG. 3 is a schematic drawing of a noise receive and measure circuit in accordance with the present invention.
Figure 4A:
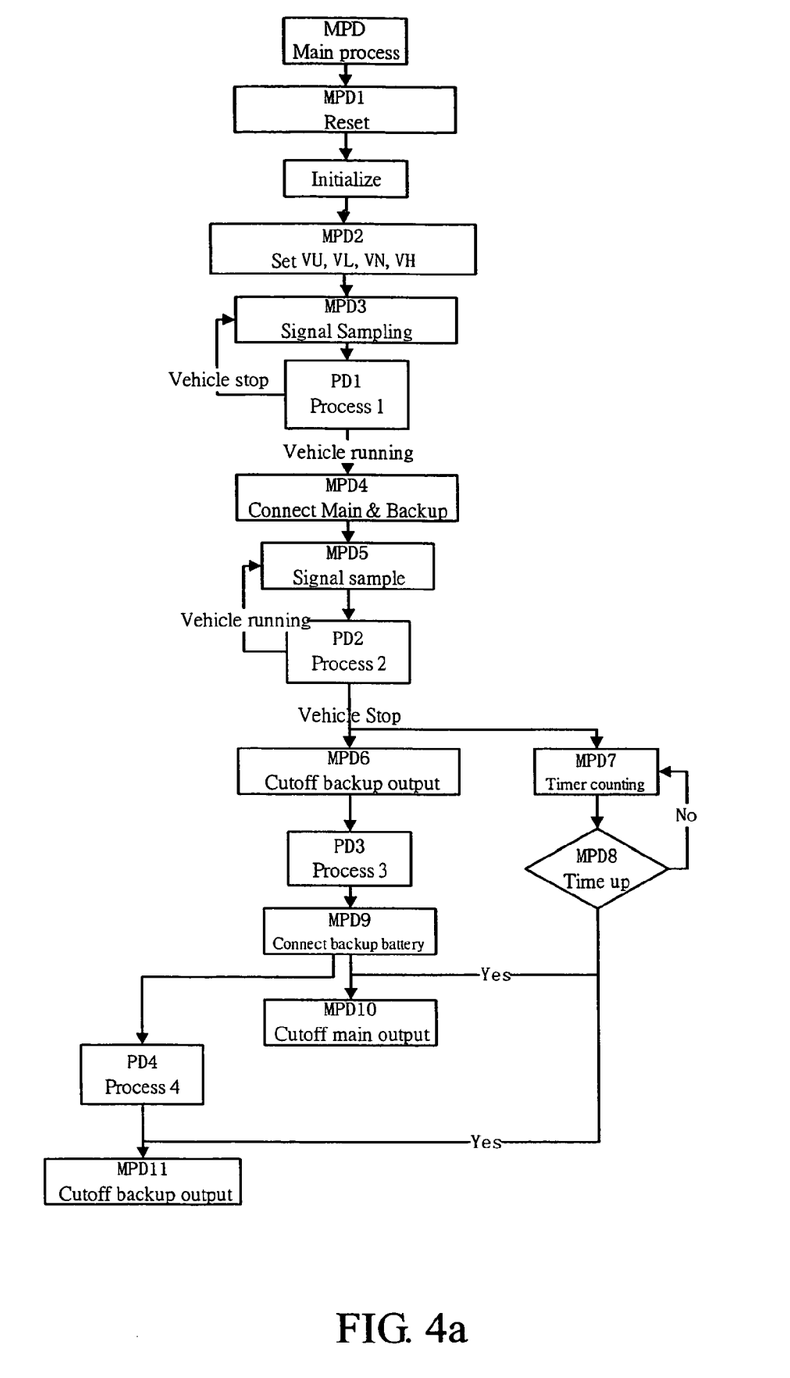
FIG. 4A is a main flow chart of a method for vehicle battery protection with battery power source noise pattern analysis in accordance with the present invention.
Figure 4B:
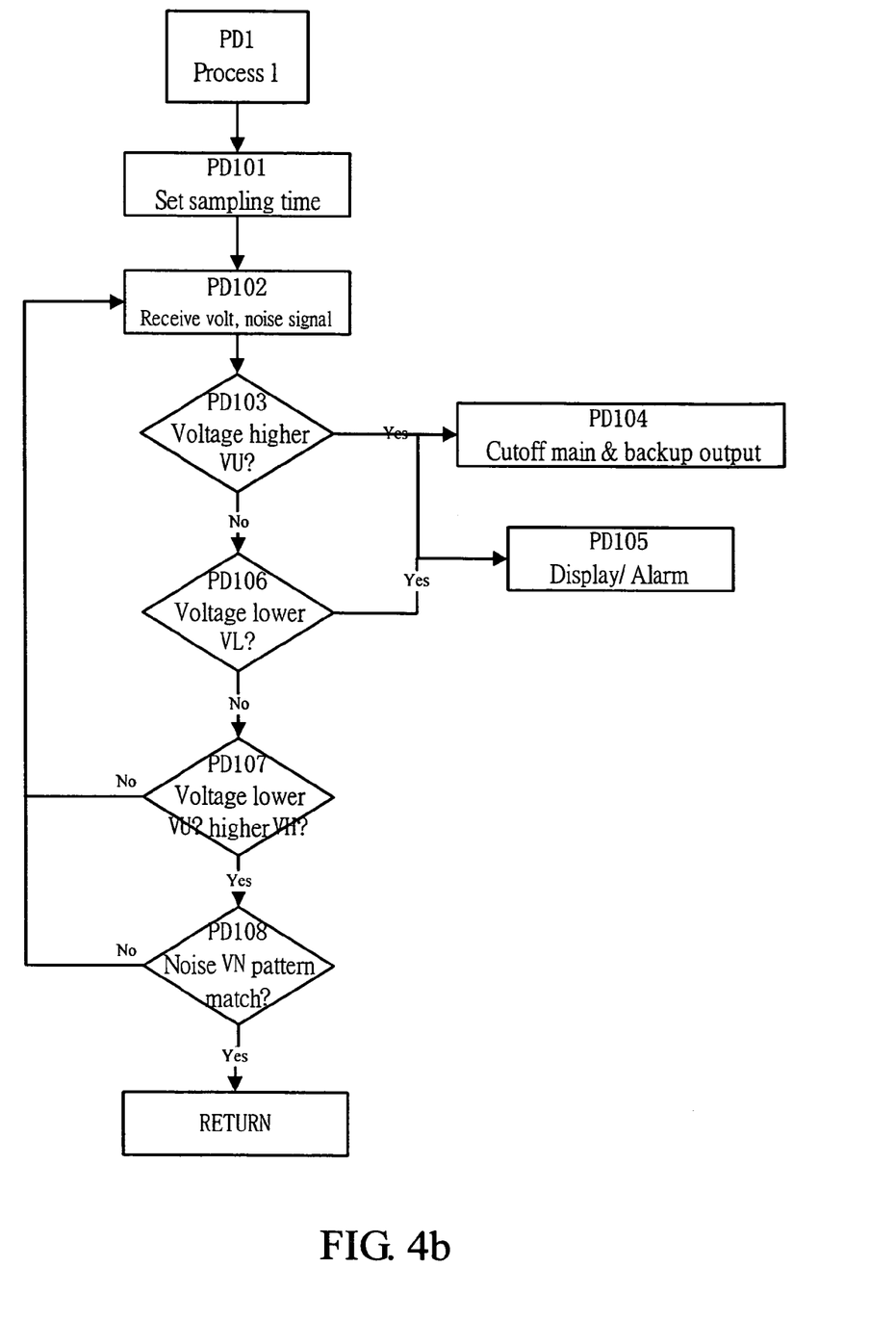
FIG. 4B is a flow chart of a first process of a method for vehicle battery protection with battery power source noise pattern analysis in accordance with the present invention.
Figure 4C:
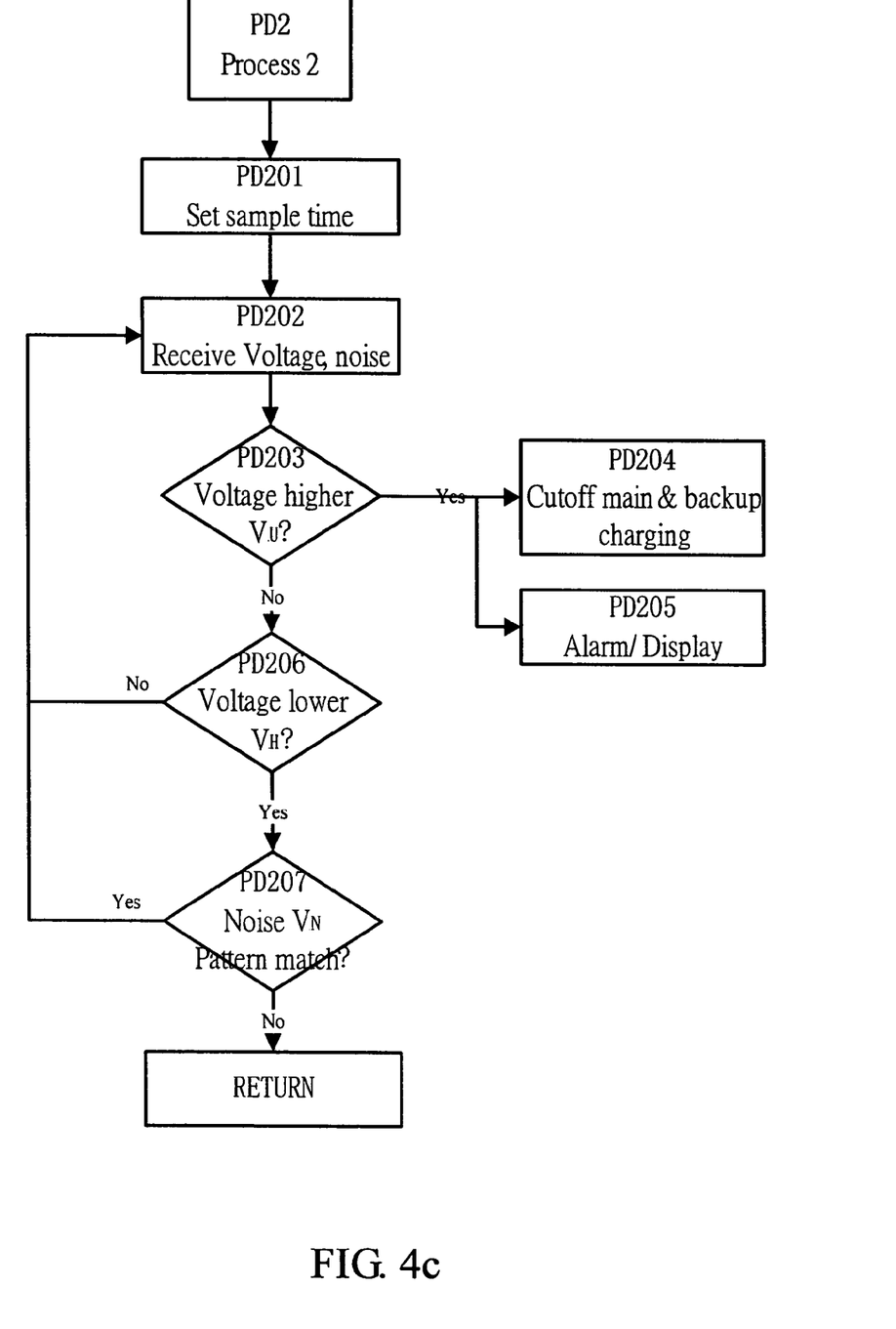
FIG. 4C is a flow chart of a second process of a method for vehicle battery protection with battery power source noise pattern analysis in accordance with the present invention.
Figure 4D:
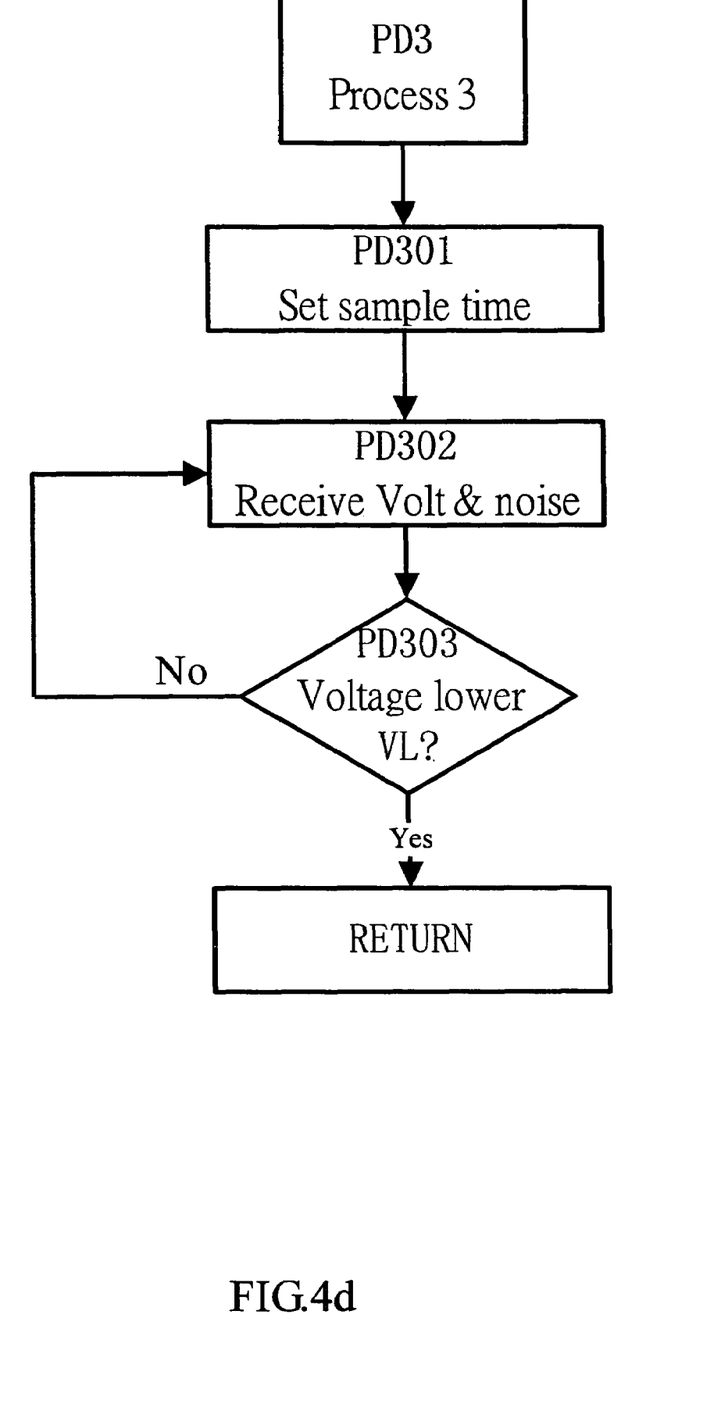
FIG. 4D is a flow chart of a third process of a method for vehicle battery protection with battery power source noise pattern analysis in accordance with the present invention.
Figure 4E:
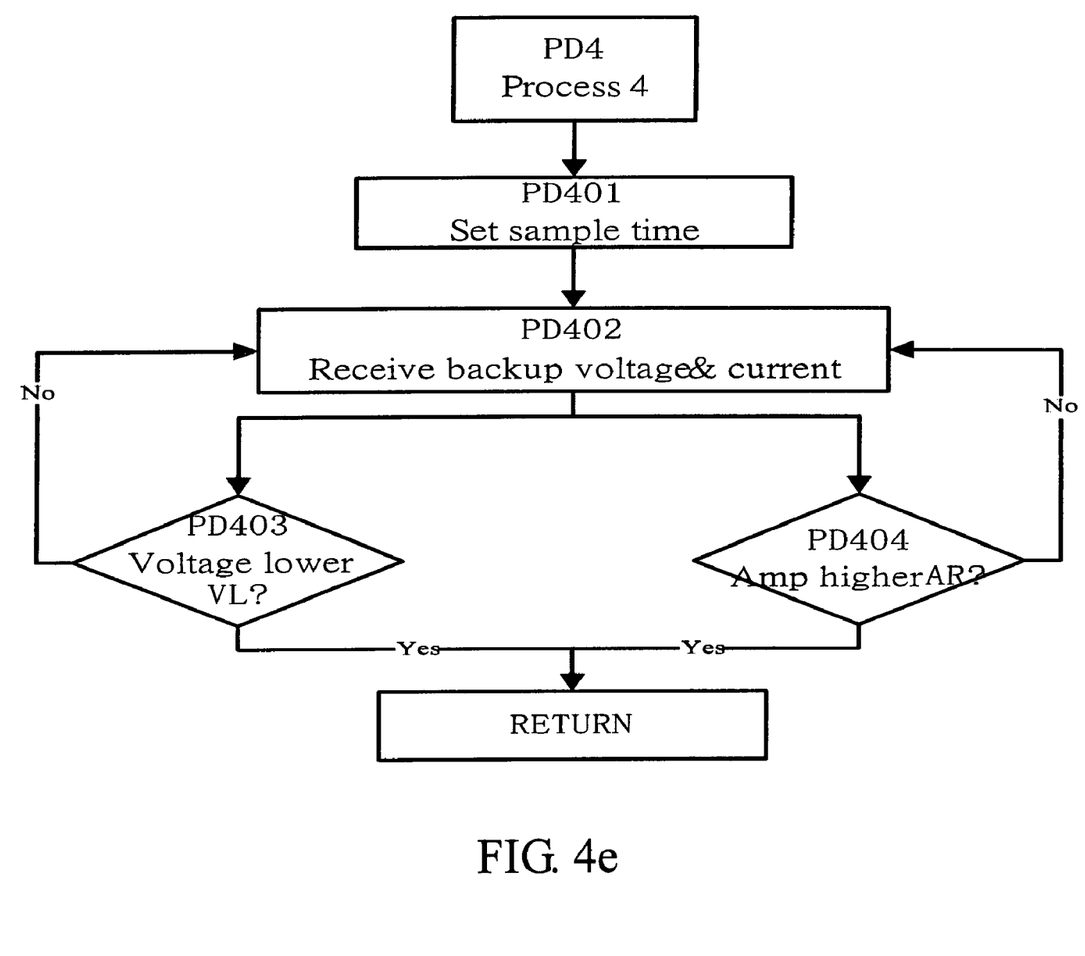
FIG. 4E is a flow chart of a fourth process of a method for vehicle battery protection with battery power source noise pattern analysis in accordance with the present invention.

Refer to FIG. 3, circuit diagram of the noise receive and measure circuit 324 is disclosed. The noise receive and measure circuit 324 consists of a noise input end for sensing voltage of the power source, then the voltage value is compared with the preset voltage reference value, being amplified by an amplifier to generate oscillator waveform and to filter out background noise, said the characteristic value of power source noise. The characteristic value of power source noise with feature of sensing noise ranging from milliseconds to seconds is output by a signal processor. Through the circuit, the characteristic value is sent to frequency analyzer 331 for pattern analysis.

As to receiving of the power source noise, the noise receive and measure circuit 324 including a pulse waveform noise detection circuit of the present invention is used, as shown in FIG. 3. The main function of the pulse waveform noise detection circuit is to detect small amplitude noise of the main battery, compare it with reference voltage to generate oscillator waveform. After filtering, the oscillator waveform is phased into DC waveform and then being input into the frequency analyzer 331. Although noise generated by starting of the generator can be measured and identified correctly through the noise receive and measure circuit 324 and the frequency analyzer frequency analyzer 331 of the source characteristic receive and measure unit 33, it is necessary to have a further checking pattern in order to avoid mistakes caused by interference. When the vehicle engine is turned on and started the generator, the battery is charged. That is the voltage is increase. When the noise is generated and the battery voltage is increased, after comparing with the pattern, these two conditions happen in a specific sampling interval, it is learned that the vehicle generator is on and is charging the batteries and a high potential is generated to enter a specific status of power management. This is another feature of the present invention.

(4) A Source Characteristic Receive and Measure Unit 33 of an Embodiment in Accordance with the Present Invention Refer to FIG. 1, the source characteristic receive and measure unit 33 includes the frequency analyzer 331 that receives characteristic values of voltage, current and noise for analysis. The frequency analyzer 331 filters the received noise for checking whether the generator is started and receives signals of voltage and current to generate digital signals. A pattern igniter 332 that receives results from the frequency analyzer 331 and generates pattern of vehicle power status is used to compare digital signals output from the frequency analyzer 331 so as to generate different combinations and driving signals of operations of vehicles and status of the main battery as well as the backup battery. A power management part 333 that generates strategy for power management according to pattern of vehicle power status is used to receive various driving signals and output signals for managing power to an actuator unit 34 so as to cut off or connect with the main battery as well as the backup battery. The power management 333 also outputs signals to an alarm/display unit 35 for generating different combinations of lights and sounds with various frequencies. In a preferred embodiment of the present invention, when the pattern igniter 332 outputs a signal showing that the voltage of the main battery 1 is lower than the first voltage $V_L$, it outputs a signal of low voltage with 1 Hz frequency and maximum 5V pulse voltage so as to make a buzzer generate alarm sounds with 1 Hz frequency.

Through steps and flows of source characteristic analysis and power management, it is identified whether vehicle engines are working normally, turn off or whether the generators operate and charge the battery. As shown from FIG. 4A to FIG. 4E, the method includes the following steps:

<1>: MPD1: installing or resetting the battery protection device in accordance with the present invention; MPD2: initializing and setting reference values of the battery protection device; MPD3: taking samples from signals;

<2>: PD1 checking the sampled signals so as to learn whether the vehicle is on and the generator works normally; checking the battery to know whether the battery is normal and is beginning to charge;

<3>: PD2 checking the vehicle so as to learn whether the vehicle stops and the battery is not charged;

<4>: PD3 checking whether the main battery is exhausted;

<5>: PD4 checking whether the backup battery is exhausted;

<6>: processing power management and alarm/display.

As shown from FIG. 4A to FIG. 4E, after the vehicle engine stopping, a method for power management of battery includes the following steps:

<1>: PD103 when the voltage of the main battery is higher than the third voltage value, an alarm/display showing abnormal voltage of the main battery is sent for reminding drivers that the might reason is output voltage of the vehicle generator malfunction;

<2>: PD106 when the voltage of the main battery is lower than the first voltage $V_L$, an alarm/display showing abnormal voltage of the main battery is sent for reminding drivers that the battery is in abnormal status;

<3>: MPD4 when the voltage of the main battery is within normal range and the comparison result of the detected noise shows that the vehicle generator is normal and is able to charge the main battery as well as the backup battery, connect the present invention with the main battery and the backup battery;

<4>: MPD6 when the voltage of the main battery is lower than the second voltage $V_H$ and the comparison result of detected signals shows there is no noise pattern, cut off power from the backup battery and start clocking according to set timing of a variable timer;

<5>: MPD9 when the voltage of the main battery is lower than the first voltage $V_L$ or the time is up, connect the backup battery and take the step MPD10, cut off power output of the main battery;

<6>: when the voltage of the backup battery is lower than the first voltage $V_L$, take the step MPD11, cut off power from the backup battery;

<7>: once external power consumption is over loading of the present invention or there is a short happened in outside electrics, output current is higher than limited current $A_R$, take the step MPD11, cut off power from the backup battery for sake of safety and preventing the battery from ageing caused by power exhaustion.

Work flow of a program for frequency analysis and power management includes the steps of:

<1>: MPD2 calculate reference values of the third voltage $V_U$, the first voltage $V_L$, the second voltage $V_H$, and the voltage noise variation $V_N$;

<2>: PD101-PD201-PD301-PD401 set sampling time of receiving each signal;

<3>: in the step PD103, compare the battery voltage with the third voltage $V_U$, if the battery voltage is higher than the third voltage $V_U$, output a signal as well as alarm/display;

<4>: in the step PD106, compare the battery voltage with the first voltage $V_L$, if the battery voltage is lower than the first voltage $V_L$, output alarm/display;

<5>: in the step PD107, compare the battery voltage with the third voltage $V_U$ and the second voltage $V_H$, if the battery voltage is lower than the third voltage $V_U$ while higher than the second voltage $V_H$, output alarm/display;

<6>: in the step PD108, compare the voltage noise variation $V_N$ with the frequency pattern according to voltage and noise. If it matches the pattern, output signals;

<7>: in the step PD203, compare the battery voltage with the third voltage $V_U$, if the battery voltage is higher than the third voltage $V_U$, output signals as well as alarm/display;

<8>: in the step PD206, compare the battery voltage with the second voltage $V_H$, if the battery voltage is lower than the second voltage $V_H$, continue receiving signals and checking;

<9>: in the step PD207, compare the voltage noise variation $V_N$ with the frequency pattern according to voltage and noise. If it doesn't match the pattern, output signals;

<10>: in the step PD303, compare the battery voltage with the first voltage $V_L$, if the battery voltage is higher than the first voltage $V_L$, continue receiving signals and checking;

<11>: in the step PD403, compare the backup battery voltage with the first voltage $V_L$, if the battery voltage is higher than the first voltage $V_L$, continue receiving signals and checking;

<12>: in the step PD404, compare the backup battery current with the limited amperage $A_R$, if the backup battery current is higher than the first voltage $V_L$, output signals;

(5) an Actuator Unit 34 of an Embodiment in Accordance with the Present Invention:

as shown in FIG. 1, the actuator unit 34 consists of a variable timer circuit 341, an output controller 342 and a source cutoff and connection circuit 343. The internal circuit of the variable timer circuit 341 is time set circuit composed by four sets of toggle switch in combination with four sets of resistance. By respective on/off of the four sets of toggle switch, there are 16 kinds of variable timing status. A sample of variable timing at half an hour interval is that the time is set from 15, 30 minutes to 7 hours and the switches are turned on at half an hour interval. The output controller 342 connects with the main battery 1, the backup battery 2, and the variable timer 341 and is disposed between the power management 333 and the over voltage protector 311, as well as between the power management part 333 and the over voltage protector 311. When the power management part 333 sends a signal to the main battery 1 or the backup battery 2 for connection or cutoff, or the time of the variable timer circuit 341 is up, the output controller 342 outputs a signal to the source cutoff and connection circuit 343 so as to supply or cut off the power to the outside device 4, or stops charging the main battery 1 or the backup battery 2.

(6) An Alarm/Display Unit 35 of an Embodiment in Accordance with the Present Invention:

Refer to FIG. 1, the alarm/display unit 35 receive signals with various values and voltage to generate different display/alarm. In a preferred embodiment of the present invention, when the power management 333 outputs a control signal to the output controller 342, it also outputs high voltage with frequency of 1 Hz or 2 Hz. Through circuit of diode, the switch is closed to form a circuit so that a buzzer generates alarming sounds with frequency of 1 Hz or 2 Hz. When the power management 333 outputs a control signal to the output controller 342, it also outputs various voltage signal for driving LED light sets of a display 351. By various combinations of lighting of the LED light sets, it is learned that whether the main battery 1 and the backup battery 2 are full charge, abnormal, connection or cutoff, etc.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A method for vehicle battery protection with battery power source noise pattern analysis comprising the steps of:
   i) getting power source signal from positive and negative poles of a main battery and a backup battery of vehicles;
   ii) measuring voltage of the main battery at a specific sampling time;
   iii) measuring current of the backup battery at a specific sampling time;
   iv) measuring voltage of the backup battery at a specific sampling time;
   v) measuring voltage noise of a vehicle generator at a specific sampling time;
   vi) enter a first power management pattern when detected voltage values of successive sampling signals of the main battery in a certain interval are higher than a third voltage;
   vii) enter a second power management pattern when detected voltage values of successive sampling signals of the main battery in a certain interval are lower than a first voltage;
   viii) enter a seventh power management pattern when detected current values of successive sampling signals in a certain interval are higher than a limited current, wherein, the successive sampling time in a certain interval ranging from 5 to 8, or equivalent with sampling time;
   ix) when the detected battery voltage values of successive sampling signals in a certain interval are lower than the third voltage and higher than a second voltage, and the power source noise variation matches noise pattern that the generator charges the batteries, it is learned that the vehicle is turned on normally and the generator charges the main battery as well as the backup battery so that a third power management pattern is taken; wherein the successive sampling times of the main battery in a certain interval ranging from 4 to 9, or equivalent with sampling time, and the successive sampling times of the noise in a certain interval ranging from 6 to 10, or equivalent with sampling time;
   x) when the detected battery voltage values of successive sampling signals in a certain interval are lower than the second voltage and the voltage noise variation doesn't match noise pattern that the generator charges the batteries, it is leaned that the engine is off and stops charging the batteries while other electric appliances still consume power, and a fourth power management pattern is taken; wherein the successive sampling times of the main battery in a certain interval ranging from 4 to 9, or equivalent with sampling time, and the successive sampling times of the noise in a certain interval ranging from 6 to 10, or equivalent with sampling time;
   xi) under the fourth power management pattern, when the preset timing of a variable timer is up, take the fifth power management pattern; wherein the time of the variable timer is set from 0 minutes to the defined hours and the switches are turned on at predetermined interval;
   xii) when the detected battery voltage values of successive sampling signals in a certain interval are lower than the first voltage and the power source noise variation doesn't match noise pattern that the generator charges the batteries, it is leaned that the engine is off and stops charging the batteries while other electric appliances still consume power so that the main battery power is lowered to safe limit, and a sixth power management pattern is taken; wherein the successive sampling times of the main battery in a certain interval ranging from 4 to 9, or equivalent with sampling time, and the successive sampling times of the noise in a certain interval ranging from 6 to 10, or equivalent with sampling time;
   xiii) on the first power management pattern, cut off and stop charging the main battery as well as the backup battery, and display that the batteries are full charged;
   xiv) on the second power management pattern, take alarming and display that the battery voltage is low;
   xv) on the third power management pattern, connect and charge the main battery as well as the backup battery, and display charging status;
   xvi) on the fourth power management pattern, display power exhaustion of the main battery, and supply power from the backup battery;
   xvii) on the fifth power management pattern, cut off power supply from the main battery when the preset time is up, display power exhaustion of the main battery, and supply power from the backup battery;

xviii) on the sixth power management pattern, cutoff power supply from the backup battery, display power exhaustion of the main battery as well as the backup battery while the power is enough for restarting the vehicle;

xix) on the seventh power management pattern, cutoff power supply from the main battery as well as the backup battery, display/alarm abnormal status or short circuit of vehicle electric appliances and take measures for protection of the batteries and the vehicle.

2. The method as claimed in claim 1, further comprises i) when the detected main battery voltage values of successive sampling signals in a certain interval are lower than the third voltage and higher than the second voltage, and the power source noise variation matches noise pattern that the generator charges the batteries, it is learned that the vehicle is turned on normally and the generator charges the main battery as well as the backup battery so that a third power management pattern is taken; wherein the successive sampling times of the main battery in a certain interval ranging from 3 to 7, or equivalent with sampling time, and the successive sampling times of the noise in a certain interval ranging from 4 to 8, or equivalent with sampling time;

ii) when the detected main battery voltage values of successive sampling signals in a certain interval are lower than the second voltage, and the power source noise variation doesn't match noise pattern that the generator charges the batteries, it is learned that the vehicle engine is turned off and the batteries stop charging while other electric appliances still consume power, then take the fourth power management pattern; wherein the successive sampling times of the main battery in a certain interval ranging from 3 to 7, or equivalent with sampling time, and the successive sampling times of the noise in a certain interval ranging from 4 to 8, or equivalent with sampling time;

iii) under the fourth power management pattern, when the preset time of the variable timer is up, take the fifth power management pattern;

iv) when the detected main battery voltage values of successive sampling signals in a certain interval are lower than the first voltage, and the power source noise variation doesn't match noise pattern that the generator charges the batteries, it is learned that the vehicle engine is turned off and the batteries stop charging while other electric appliances still consume power so that the main battery power is lowered to safe limit, then take the sixth power management pattern; wherein the successive sampling times of the main battery in a certain interval ranging from 3 to 7, or equivalent with sampling time and the successive sampling times of the noise in a certain interval ranging from 4 to 8, or equivalent with sampling time;

v) on the first power management pattern, cut off the main battery as well as the backup battery, stop charging the batteries and display the batteries are full;

vi) on the second power management pattern, alarm and display low voltage of the batteries;

vii) on the third power management pattern, connect the main battery as well as the backup battery, and show that the batteries are in the charge;

viii) on the fourth power management pattern, cut off the main battery as well as the backup battery, stop charging the batteries and display that the power of main battery is exhausted and the power is from the backup battery;

ix) on the fifth power management pattern, cut off power supply from the main battery, and display that the power of the main battery is exhausted and the power is from the backup battery;

x) on the sixth power management pattern, cutoff power supply from the backup battery, and display that the power of the main battery as well as the backup battery is exhausted but still with enough for restarting the vehicle.

3. The method as claimed in claim 1, wherein on step ii) sampling time ranges from 400 ms to 550 ms, threshold; on step iii) sampling time ranges from 450 ms to 600 ms, threshold; step iv) sampling time ranges from 30 ms to 60 ms, threshold.

4. The method as claimed in claim 2, wherein on step i) sampling time ranges from 300 ms to 540 ms, threshold; on step ii) sampling time ranges from 20 ms to 50 ms, threshold.

5. The method as claimed in claim 1, wherein from step v) to step x) the voltages and currents comply with relations, excluded the threshold, $$0.75 \times V_P \leq \text{the first voltage } V_L \leq 0.95 \times V_P$$

$$1.115 \times V_P \leq \text{the second voltage } V_H \leq 1.120 \times V_P$$

$$1.27 \times V_P \leq \text{the third voltage } V_U \leq 1.32 \times V_P$$

$$1.4 \times A_P \leq \text{limited current } A_R \leq 1.75 \times A_P.$$

6. The method as claimed in claim 2, wherein from step iii) to step iiv), the voltages comply with relations, excluded the threshold:

$$0.70 \times V_P \leq \text{the first voltage } V_L \leq 0.90 \times V_P$$

$$1.113 \times V_P \leq \text{the second voltage } V_H \leq 1.118 V_P$$

$$1.26 \times V_P \leq \text{the third voltage } V_U \leq 1.30 \times V_P.$$

7. The method as claimed in claim 1, wherein on step xii) checking of the noise pattern analysis is further simplified into the relation, excluded the threshold:

$$100 \text{ mV} \sim 2.4 \text{V} \leq \text{the voltage noise variation } V_N \leq 150 \text{ mV} \sim 4.8 \text{V}.$$

8. The method as claimed in claim 2, wherein on step x) checking of the noise pattern analysis is further simplified into the relation, excluded the threshold:

$$100 \text{ mV} \sim 2.4 \text{V} \leq \text{the voltage noise variation } V_N \leq 150 \text{ mV} \sim 4.8 \text{V}.$$

9. A device, a battery protector (3), for vehicle battery protection with battery power source noise pattern analysis, connected with a battery or a plurality of connected battery sets of vehicles with engines and generators in parallel, comprising a source characteristic sensing unit (32) for detecting source features of the battery sets; a source characteristic receive and measure unit (33) for analyzing power features output by the battery sets; and an actuator unit (34) for managing and controlling output and switching of the battery sets; wherein source characteristic sensing unit (32) having one or a plurality sets of sampling time circuit (321) that sets one or a plurality sets of sampling time for sampling, one or a plurality sets of voltage receive and measure circuit (322) that receives sampled voltage and converts the value of the voltage, one or a plurality sets of current receive and measure circuit (323) that receives sampled current and converts the value of the current, and one or a plurality sets of noise receive and measure circuit (324) for receiving sampled noise and converting the value of the noise;

source characteristic receive and measure unit (33) having a frequency analyzer (331) that compare and analyze the signals of voltage, current and noise for checking whether the vehicle generator is on or off and prevent interference from other electric appliances being used or not; a pattern igniter (332) that receives results from the frequency analyzer (331) and outputs signals with various pattern characteristics; a power management (333) that receives signals with various pattern characteristics, takes power management measure such as cut off, connect, or reverse the batteries and generate signals for management;

actuator unit (34) having a variable timer circuit (341) that sets different time from outside by combinations of switches and generates clocking signal, an output controller (342) that receives signals from the variable timer circuit (341) and checks signals from the power management (333) for output control signals of power cutoff or connection; and one or a plurality sets of source cutoff and connection circuit (343) that receives control signals from the output controller (342) so as to cut off or connect power from one or a plurality of batteries.

10. The device as claimed in claim 9, wherein the device further comprising the source characteristic receive and measure unit (33) with the battery power source noise pattern analysis method of claim 1.

11. The device as claimed in claim 9, wherein the device further comprising the source characteristic receive and measure unit (33) with the battery power source noise pattern analysis method of claim 2.

12. The device as claimed in claim 9, wherein the device further comprising a power supplier protector (31) for protecting the device and the power supplier protector (31) having an over voltage protector (311) to isolate over voltage, a low voltage protector (312) protects batteries when battery voltage is too low, a polar protector (313) that isolates the battery power source for protecting vehicle electric appliances and battery sets when the polarity of the battery are connected in reverse direction, and a short protector (314) that generates isolation for protecting the device and batteries when short circuit of the outside device (4) happens.

13. The device as claimed in claim 12, wherein the polar protector (313) of the power supplier protector (31) automatically transfer the device into corresponding the positive and negative polarity when the polarity of the battery are connected in reverse direction; and when the output end of the vehicle battery protection device (3) is short, cut off power source from batteries for protecting vehicle electric appliances and battery sets.

14. The device as claimed in claim 9, wherein the device further comprising an alarm/display unit (35) having a display (351) formed by one or a plurality sets of LED light for showing power management status that the device takes toward the power source of batteries, and an alarm (352) that is a buzzer generating sounds with various frequencies for warning the device taking power management measure to the power source of batteries.

15. The device as claimed in claim 14, wherein the display (351) of the alarm/display unit (35) uses LED lights to show different power management status.

16. The device as claimed in claim 14, wherein the display (351) of the alarm/display unit (35) is a liquid crystal display for showing different power management and battery status.

17. The device as claimed in claim 9, wherein the device further having a set or a plurality sets of noise receive and measure circuit (324) that compare signal from noise receiving end with the set reference signal, being amplified by an amplifier, and then the noise is converted into digital signals by a signal processor, so does the comparison ratio of the received noise to the reference signal; thus the circuit of battery protection device in accordance with the present invention is simplified.

* * * * *